April 2, 1940. A. J. FAUSEK ET AL 2,195,643
VALVE
Filed July 5, 1938
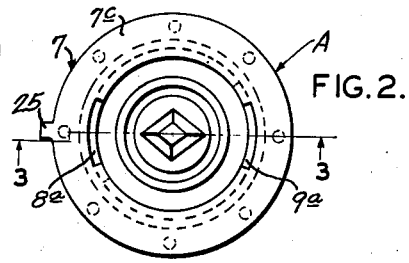
FIG. 2.
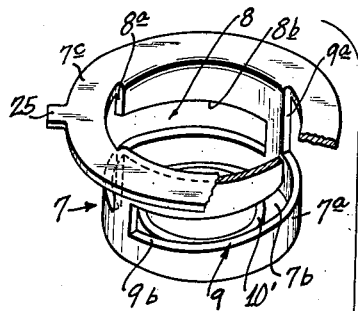
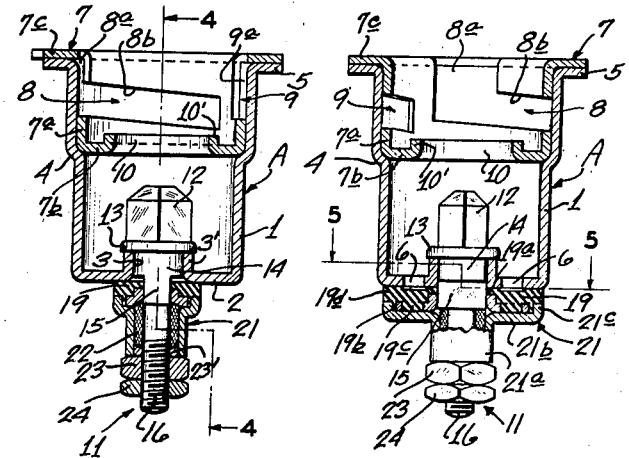
FIG. 3. FIG. 4.
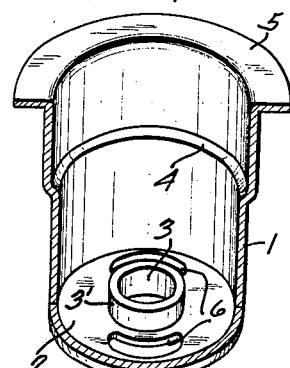
FIG. 1.
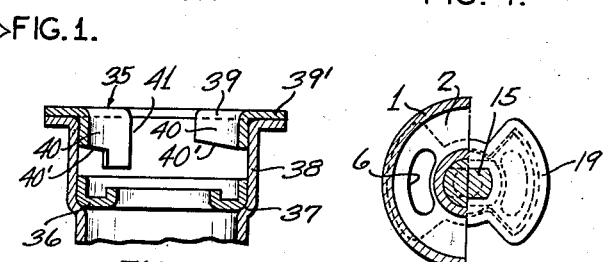
FIG. 10. FIG. 5.
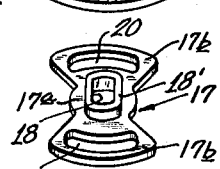
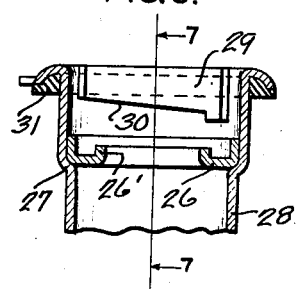
FIG. 6. FIG. 7.
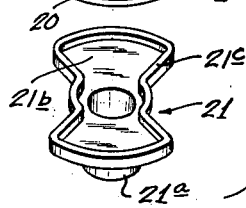
FIG. 8.
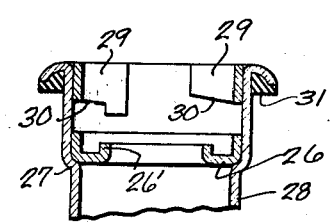
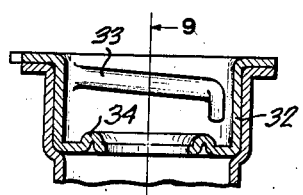
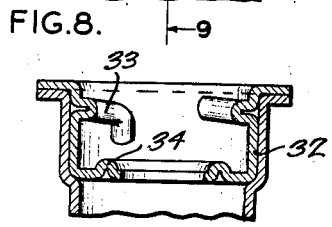
FIG. 9.
INVENTORS
ARTHUR J. FAUSEK
IRWING F. FAUSEK
BY *E. m. Harrington*
ATTORNEY Patented Apr. 2, 1940

2,195,643

UNITED STATES PATENT OFFICE 2,195,643

VALVE

Arthur J. Fausek and Irwing F. Fausek,
Clayton, Mo.

Application July 5, 1938, Serial No. 217,380

4 Claims. (Cl. 284—14)

This invention relates generally to valves and more specifically to valves of the type known as lager valves, and adapted for use in association with beer containers for sealing the containers until they are tapped and for excluding dirt and other foreign matter from the beer containers after the contents have been withdrawn therefrom, the predominant object of the invention being to provide a valve of this type which may be formed from sheet metal instead of from castings as was the case heretofore.

For many years prior to this invention lager valves have been used which were produced largely from castings and when lager valves of this construction were employed with wooden beer containers, such as the old style barrels and kegs, they functioned in a highly efficient manner. However, of late years great numbers of beer containers have been used which are formed of metal, the usual arrangement being to produce the outer shells of the containers from steel and line said outer shells with stainless steel. It has been found that when lager valves made up of castings which were not formed from stainless steel were used with containers having stainless steel linings a galvanic action was frequently set up which was highly undesirable and when the lager valves were nickelplated the plating was frequently removed from the lager valves by the galvanic action mentioned. To eliminate the production of the troublesome galvanic action, attempts were made to produce lager valves from castings made of stainless steel but because of the hardness of this material and for other reasons the machining operations required to prepare the castings for use as parts of the valves were rendered so expensive as to preclude economical production of the valves.

The main purpose of the present invention, therefore, is to provide a lager valve which may be produced from sheet metal instead of from castings as heretofore. By so producing lager valves they may be made from stainless steel and no expensive machining of the valve parts are required, and also because the lager valves are made from stainless steel no galvanic action will be set up when the valves are used with containers lined with stainless steel.

Fig. 1 is a view showing parts of the improved lager valve in perspective and in disassembled relation, certain portions of the parts of the valve being shown in section.

Fig. 2 is a plan view of the improved lager valve.

Fig. 3 is a vertical section taken on line 3—3 of Fig. 2.

Fig. 4 is a vertical section taken on the staggered line 4—4 of Fig. 3.

Fig. 5 is a horizontal section taken on the staggered line 5—5 of Fig. 4.

Fig. 6 is a fragmentary vertical section illustrating a modified form of the invention.

Fig. 7 is a fragmentary vertical section taken on line 7—7 of Fig. 6.

Fig. 8 is a fragmentary vertical section illustrating still another form of the invention.

Fig. 9 is a fragmentary section taken on line 9—9 of Fig. 8.

Fig. 10 is a fragmentary section of still another form of the invention.

In the drawing, wherein are shown for the purpose of illustration, merely, several embodiments of the invention, A designates in Figs. 2, 3, and 4 the improved lager valve generally. The lager valve A includes a body 1 which is of hollow, cylindrical form, said body being provided with a bottom wall 2 in which a centrally located opening 3 is formed which is defined by an annular upstanding flange 3'. The upper portion of the body 1 of the valve A is of greater diameter than the lower portion thereof and at the junction of the larger and smaller diameters of the body an annular shoulder 4 is provided within said body as shown clearly in Figs. 1, 3, and 4. At the upper end of the body 1 of the valve A an integral outwardly extended, annular flange 5 is provided, and formed in the bottom wall 2 of the body of the valve A is a pair of oppositely disposed, arcuate openings 6 which serve as passageways through which beer passes when the valve is in an open condition as will hereinafter appear. The body 1 is formed from sheet metal with the aid of dies or in any other suitable manner.

Disposed within the upper portion of the body 1 is a cup 7, said cup comprising a circumferential side wall 7a, a bottom wall 7b, and an annular outwardly extended, flange 7c at the upper end of the side wall 7a. When the cup 7 is assembled with the body 1 of the valve A the upper flange 7c thereof rests upon the corresponding flange 5 of the body and the outer edge portion of the bottom wall of the cup rests on the annular shoulder 4 within the valve body. The cup may be retained in its assembled relation with respect to the body of the valve by being pressed into tight contact with the inner face of the upper portion of said body, or, if preferred, the cup may be secured to the body in any suitable manner, such, for instance, as by welding.

The circumferential side wall 7a of the cup 7 has formed therein a pair of substantially L-shaped slots 8 and 9, said slots being provided with relatively short vertical portions 8a and 9a which are open at the top face of the annular flange 7c of said cup and communicate at their lower ends with substantially horizontal but slightly downwardly inclined portions 8b and 9b of the slots 8 and 9. Also the bottom wall 7b of the cup 7 is provided with a centrally located opening 10 which is defined by an upstanding annular flange 10'. The cup 7 is formed from sheet metal with the aid of dies or in any other suitable manner.

Associated with the body 1 of the valve A is a valve stem 11 which at its upper end is provided with a noncircular head portion 12, said head portion at its lower end being provided with a flange 13 which contacts with the top edge of the upstanding flange 3' of the bottom wall of the body of the valve. The portion 14 of the valve stem located immediately below the flange 13 of the head portion 12 of said stem is circular in cross-section and is disposed in the opening 3 with its circumferential face contacting with the inner face of the upstanding flange 3'. The portion 15 of the stem 11 located immediately beneath the circular portion 14 is provided with opposed, flat side faces as shown in Fig. 4, which give to the stem portion 15 an elongated, noncircular cross-sectional shape. The portion 16 of the valve stem 11 located below the noncircular portion 15 is circular in cross-section and is externally screw threaded.

Mounted on the valve stem 11 is a valve head which includes an element 17 shaped as shown to the best advantage in Fig. 1, said element comprising a central portion 17a from which flared portions 17b extend outwardly in opposite directions. The central portion of the element 17 is provided with a centrally located noncircular opening 18 which corresponds in shape and size with the cross-section of the portion 15 of the valve stem and said portion 15 of the valve stem extends through the opening 18 of the element 17. The opening 18 of the element 17 is surrounded by an upstanding flange 18' which contacts with the portion 15 of the valve stem.

Associated with the element 17 is a facing 19 formed of rubber or other suitable material which is applied to the upper face of said element. As shown in Figs. 3 and 4 the facing 19 is of considerable thickness, said facing extending to a point above the top edge of the flange 18' of the associated element to provide a thickness 19a of the facing above said top edge of said flange 18'. Also a thickness 19b of the facing 19 is disposed at the outer edge of the element 17 as shown in Figs. 3 and 4. The element 17 has formed in the portions 17b thereof a pair of arcuate openings 20 which correspond in shape and dimensions with the openings 6 formed in the bottom wall 2 of the valve body 1, and when the valve is in a closed condition the openings 20 of said element 17 are alined with the openings 6 in the bottom wall of the valve body. The facing 19 associated with the element 17 includes portions 19c which are disposed in the openings 20 of the element 17 so that when the valve is in a closed condition solid thicknesses of facing material are disposed beneath the openings 6 in the bottom wall of the valve body 1, said thicknesses of facing material extending from top face of the facing 19, which contacts with the lower face of the valve body, to the lower face of the element 17.

The valve head includes also a member 21 which comprises a lower sleeve portion 21a, a horizontal wall 21b, and a marginal upstanding flange 21c. The upper portion of the member 21 corresponds in shape with the element 17 and said element 17 rests on the horizontal wall 21b of said member and is surrounded by the upstanding flange 21c of said member 21, the inner face of said upstanding flange contacting with the thickness 19b of the facing 19 and the upper edge of said upstanding flange 21c of said member 21 being in contact with the lower face of a lateral marginal extension 19d of the facing 19 as shown in Fig. 4. The lower sleeve portion 21a of the member 21 surrounds the portion 16 of the valve stem 11 and said sleeve portion is of such diameter that an annular space is present between the inner face of the sleeve portion 21a of the member 21 and the portion 16 of the valve stem. This annular space receives packing material 22 to which pressure is applied by a gland 23' which is mounted on the valve stem portion 16 and is projected into the sleeve portion 21a of the member 21, as shown in Fig. 3, the packing material being interposed between an annular inclined face at the upper end of the gland 23' and a corresponding annular inclined face formed at the bottom of the element 17. A nut 23 contacts with the gland 23' and in order to prevent unintended rotation of the nut 23 a lock nut 24 is mounted on the stem portion 16 for engagement with said nut. The element 17 and the member 21 are formed from sheet metal just as are the valve body 1 and the cup 7.

In the use of the improved lager valve said valve is disposed in an opening formed in beer container in the usual manner, the tongue 25 extended from the flange 7c of the cup 7 being extended into a cavity formed in the container so as to prevent unintended rotation of the valve body. When, in the use of the improved valve, it is desired to tap or vent a container with which the valve is associated the appropriate fitting is associated with the lager valve, the laterally extended lugs on the fitting being moved downwardly through the vertical portions 8a and 9a of the slots 8 and 9 and the noncircular socket of the fitting moving over the noncircular head 12 of the valve stem 11. The fitting is then rotated in a clockwise direction to move the lugs of the fitting through the downwardly inclined portions 8b and 9b of the slots in contact with the upper edges of said slot portions and simultaneously rotate the valve stem to move the portions of the valve head which close the openings 6 of the valve body, away from said openings. When the fitting is rotated as described the engagement of the lugs of the fitting with the inclined top edges of the slot portions 8b and 9b will cam the fitting downwardly to force a portion of said fitting into fluid-tight contact with the top edge of the upstanding flange 10' of the cup 7 whereupon the valve is in an open condition and ready for use. When the contents of the container have been withdrawn therefrom the fitting is rotated in a counter-clockwise direction to move the valve head to a position where portions thereof close the openings 6 and to bring the lugs of the fitting in line with the vertical portion of the slots 8 and 9. The fitting is then moved outwardly to move the lugs thereof through said vertical portions of the slots 8 and 9 and thereby disengage the fitting from the valve.

By forming the openings 20 in the element 17 and disposing relatively thick portions of the facing 19 in said openings the likelihood that portions of the facing will be forced into openings 6 in the bottom wall of the valve body is greatly reduced, as said thick portions of the facing tend to cushion the upward thrust of the valve head by the gland 23 contacting with the lower edge of the sleeve portion 21a of the member 21.

In Figs. 6 and 7 a form of the invention is illustrated where the cup, instead of being made in one piece as is the cup 7 of Figs. 1, 2, 3, and 4, is made up of a plurality of pieces. In Figs. 6 and 7 the cup includes a lower portion 26 which rests on the shoulder 27 within the body 28 of the valve, and a pair of upper portions 29 which are provided with inclined cam faces 30 in engagement with which the lugs of the fitting being attached to the valve move to cam a portion of the fitting downwardly into fluid-tight contact with the top edge of the annular upstanding flange 26'. The lower portion 26 of the cup of Figs. 6 and 7 may be pressed into tight engagement with the wall of the valve body or said lower portion 26 may be welded or otherwise secured to the valve body. The upper portions 29 of the cup of Figs. 6 and 7 may be welded or otherwise secured to the valve body. The top flange of the valve body 28 of Figs. 6 and 7 is curved as illustrated and said curved flange has a gasket 31 associated with it.

In Figs. 8 and 9 the cup 32 is made in one piece, but instead of slotting the cup to provide cam faces which are engaged by the lugs of a fitting being associated with the valve as in Figs. 1, 2, 3, and 4, such cam faces are provided by ribs 33 which are pressed inwardly from the annular side wall of the cup. Also in Figs. 8 and 9, the seat into contact with which a portion of the fitting being associated with the valve is cammed by the ribs 33, is provided by an annular upstanding rib 34.

In Fig. 10 still another form of the invention is illustrated. This form of the invention closely resembles the form shown in Figs. 6 and 7 with the exception that the cup 35 is made in two parts instead of three parts as in the views mentioned. In Fig. 10 the cup 35 is comprised of a lower portion 36, similar to the portion 26 of Figs. 6 and 7, which is seated on the annular shoulder 37 of the valve body 38, and an upper portion 39 which includes an annular flange 39' from which are extended downwardly in contact with the inner face of the valve body portions 40 which are provided with inclined cam faces 40' that receive in engagement therewith extensions on a fitting being associated with the valve. The upper portion 39 of the structure of Fig. 10 includes also opposed vertical passageways 41 (one of which is illustrated) through which the extensions on the fitting are moved downwardly so that said extensions may be moved in engagement with the cam faces 40'. The valve illustrated in Fig. 10 may be assembled by pressing the lower portion 36 of the cup 35 into tight contact with the inner face of the body of the valve, or by welding said lower portion to the valve body. The upper portion 39 of the cup 35 of Fig. 10 may likewise be tightly pressed into place or welded to the body of the valve.

While we have mentioned specifically herein stainless steel as the lining material for beer containers this was done because many beer containers are lined with this material. However beer containers may be lined with other materials, such as Monel metal and aluminum, and in such event the lager valves used with containers lined with either of such materials would be formed from the same material of which the linings of the containers are formed in order to avoid production of the galvanic action hereinbefore mentioned. By producing the lager valves from sheet material stronger valves are provided in as much as sheet metal is denser than the material of castings.

We claim:

1. A lager valve comprising a hollow cylindrical body having a fixed wall at one end thereof which partially closes said hollow cylindrical body at said end, said wall having an opening formed therethrough substantially centrally thereof and being provided with a valve aperture formed therethrough, insert means fixedly disposed within said hollow cylindrical body, said insert means including a portion providing a valve seat having a centrally located opening formed therethrough and having means located adjacent to said opening adapted to receive in contact therewith a fitting adapted for association with the lager valve, a portion provided with a cam face adapted to be engaged by a portion of said fitting so as to cam said fitting into operative relation with said means of said valve seat upon rotation of said fitting relative to said hollow cylindrical body, a valve stem extended through the centrally located opening of said wall of said hollow cylindrical body, and a valve head rotatable with said stem in contact with said wall of said hollow cylindrical body and with respect to the valve aperture therein.

2. A lager valve comprising a hollow cylindrical body having a fixed wall at one end thereof which partially closes said hollow cylindrical body at said end, said wall having an opening formed therethrough substantially centrally thereof and being provided with a valve aperture formed therethrough, insert means fixedly disposed within said hollow cylindrical body, said insert means including a portion providing a valve seat having a transverse wall provided with a centrally located opening formed therethrough and having annular projected means surrounding said opening which is adapted to receive in contact therewith a fitting adapted for association with the lager valve, and a portion provided with a cam face adapted to be engaged by a portion of said fitting so as to cam said fitting into operative relation with said annular projected means of said valve seat upon rotation of said fitting relative to said hollow cylindrical body, a valve stem extended through the centrally located opening of said wall of said hollow cylindrical body, and a valve head rotatable with said stem in contact with said wall of said hollow cylindrical body and with respect to the valve aperture therein.

3. A lager valve comprising a hollow cylindrical body having a fixed wall at one end thereof which partially closes said hollow cylindrical body at said end, said wall having an opening formed therethrough substantially centrally thereof and being provided with a valve aperture formed therethrough, an annular flange formed on said wall of said hollow cylindrical body which surrounds the centrally located opening thereof, insert means fixedly disposed within said hollow cylindrical body, said insert means including a portion providing a valve seat having a transverse wall provided with a centrally located opening formed therethrough and having annular projected means surrounding said opening which is adapted to receive in contact therewith a fitting adapted for association with the lager valve, and a portion provided with a cam face adapted to be engaged by a portion of said fitting so as to cam said fitting into operative relation with said annular projected means of said valve seat upon rotation of said fitting relative to said hollow cylindrical body, a valve stem extended through the centrally located opening of said wall of said hollow cylindrical body and supported by the flange surrounding said opening, and a valve head rotatable with said stem in contact with said wall of said hollow cylindrical body and with respect to the valve aperture therein.

4. A lager valve comprising a hollow cylindrical body formed of sheet material and provided with an outwardly extended annular flange at one end and having a fixed wall at its opposite end which partially closes said hollow cylindrical body at said end thereof, an annular flange formed on said wall which defines an opening that extends through said wall substantially centrally thereof, said wall having a valve aperture formed therethrough, a shoulder formed on said hollow cylindrical body at the inner face thereof, insert means fixedly disposed within said hollow cylindrical body, said insert means including a portion providing a valve seat that contacts with said shoulder and is provided with an annular flange that defines an opening through said valve seat and which is adapted to receive in contact therewith a fitting adapted for association with the lager valve, and a portion provided with a cam face adapted to be engaged by a portion of said fitting so as to cam said fitting into operative relation with the annular flange of said valve seat upon rotation of said fitting relative to said hollow cylindrical body, a valve stem supported by said annular flange of said wall of said hollow cylindrical body, and a valve head rotatable with said stem in contact with said wall of said hollow cylindrical body and with respect to the valve aperture therein.

ARTHUR J. FAUSEK.
IRWING F. FAUSEK.